(12) United States Patent
Hirvonen et al.

(10) Patent No.: US 11,137,490 B2
(45) Date of Patent: Oct. 5, 2021

(54) NAVIGATIONAL AID WITH ADAPTIVE RADAR

(71) Applicant: Teknologian tutkimuskeskus VTT, VTT (FI)

(72) Inventors: Mervi Hirvonen, VTT (FI); Tero Kiuru, VTT (FI); Janne Hakli, VTT (FI); Pekka Pursula, VTT (FI)

(73) Assignee: TEKNOLOGIAN TUTKIMUSKESKUS VTT, VTT (FI)

( * ) Notice: Subject to any disclaimer, the term of this patent is extended or adjusted under 35 U.S.C. 154(b) by 406 days.

(21) Appl. No.: 14/487,190

(22) Filed: Sep. 16, 2014

(65) Prior Publication Data

US 2016/0077202 A1 Mar. 17, 2016

(51) Int. Cl.
*G01S 13/90* (2006.01)
*G01S 13/93* (2020.01)
(Continued)

(52) U.S. Cl.
CPC .......... *G01S 13/426* (2013.01); *A61H 3/061* (2013.01); *G01S 13/86* (2013.01); *G01S 13/90* (2013.01); *G01S 13/93* (2013.01); *A61H 2003/063* (2013.01); *A61H 2201/0184* (2013.01); *A61H 2201/5023* (2013.01);
(Continued)

(58) Field of Classification Search
CPC ........ G01S 13/426; G01S 13/93; G01S 13/86; G01S 13/90; A61H 3/061; A61H 23/02; A61H 23/0254; A61H 23/0245; A61H 2201/5097; A61H 2201/5058; A61H 2003/063; A61H 2201/5084;
(Continued)

(56) References Cited

U.S. PATENT DOCUMENTS 3,704,378 A * 11/1972 Robb .................. G09B 21/003
250/216
5,052,637 A * 10/1991 Lipps .................. F41G 7/2213
244/3.15
(Continued)

FOREIGN PATENT DOCUMENTS

CN 101076741 A 11/2007
CN 102141611 A 8/2011
(Continued)

OTHER PUBLICATIONS

Y. Zhao, S. Yuan, Y. Wang, "Research on beam forming of smart antennas in the TD-SCDMA system," Electronic Science and Technology, vol. 21, No. 11, pp. 5-8, Feb. 2008.

*Primary Examiner* — Matthew M Barker
(74) *Attorney, Agent, or Firm* — Squire Patton Boggs (US) LLP (57) ABSTRACT

A portable electronic navigational aid (104) e.g. for the blind (102), comprising a radio frequency, preferably millimeter wave, radar (218) with at least one transmitting (TX) channel and a plurality of receiving (RX) channels, at least one orientation sensor (220) configured to obtain data indicative of the orientation of the radar, and a processing element (210) configured to adaptively control (500, 602) the beamforming of the radar based on the data provided by the orientation sensor. A corresponding method is presented. An accessory, such as a replaceable cover, containing a radio frequency radar for attaching to an electronic host device is presented.

13 Claims, 4 Drawing Sheets

(51) Int. Cl.
*A61H 3/06* (2006.01)
*G01S 13/42* (2006.01)
*G01S 13/86* (2006.01)

(52) U.S. Cl.
CPC .......... *A61H 2201/5048* (2013.01); *A61H 2201/5058* (2013.01); *A61H 2201/5084* (2013.01)

(58) Field of Classification Search
CPC .... A61H 2201/5048; A61H 2201/0184; G01C 21/165
See application file for complete search history.

(56) References Cited

U.S. PATENT DOCUMENTS

| | | | | |
|---|---|---|---|---|
| 5,818,381 A * | 10/1998 | Williams | ............... | A61H 3/061 342/24 |
| 6,184,825 B1 | 2/2001 | Wehner et al. | | |
| 6,489,605 B1 | 12/2002 | Ritz et al. | | |
| 6,885,335 B2 * | 4/2005 | Suzuki | ............... | G01S 7/032 180/169 |
| 6,954,174 B2 * | 10/2005 | Isaji | ............... | G01S 7/4026 180/167 |
| 7,248,205 B2 * | 7/2007 | Uchino | ............... | G01S 7/285 342/108 |
| 7,336,226 B2 * | 2/2008 | Jung | ............... | A61H 3/061 342/357.52 |
| 7,586,434 B1 * | 9/2009 | Hamalainen | ............... | G01S 13/9035 342/25 A |
| 7,735,230 B2 * | 6/2010 | Barany | ............... | A42B 3/0433 33/1 CC |
| 7,973,704 B2 * | 7/2011 | Storz | ............... | G01S 13/34 342/118 |
| 8,144,051 B2 * | 3/2012 | Lok | ............... | G01S 7/023 342/159 |
| 8,502,744 B2 * | 8/2013 | Shih | ............... | H01Q 1/281 343/761 |
| 9,401,540 B2 * | 7/2016 | Osterhout | ............... | H01Q 1/273 |
| 2006/0261978 A1 * | 11/2006 | Yokota | ............... | G08G 1/005 340/933 |
| 2007/0268178 A1 | 11/2007 | Jung et al. | | |
| 2009/0167593 A1 | 7/2009 | Storz et al. | | |
| 2009/0322616 A1 | 12/2009 | Bandhauer | | |
| 2012/0092224 A1 * | 4/2012 | Sauleau | ............... | H01Q 3/18 343/771 |
| 2012/0235851 A1 * | 9/2012 | Park | ............... | G01S 7/4026 342/70 |
| 2013/0121498 A1 * | 5/2013 | Giesbrecht | ............... | H04M 9/082 381/66 |
| 2013/0194126 A1 * | 8/2013 | Paoletti | ............... | G01S 13/04 342/55 |
| 2015/0198711 A1 * | 7/2015 | Zeng | ............... | G01S 13/726 342/59 |
| 2016/0003938 A1 * | 1/2016 | Gazit | ............... | G01S 13/02 342/81 |

FOREIGN PATENT DOCUMENTS

| | | |
|---|---|---|
| CN | 102288962 | 12/2011 |
| JP | H11251900 | 9/1999 |
| JP | 2005324566 A | * 11/2005 |
| JP | 2005324566 A | 11/2005 |
| JP | 2005341218 | 12/2005 |
| JP | 2006324924 | 11/2006 |
| JP | 2007093480 | 4/2007 |
| JP | 2013015522 | 1/2013 |
| JP | 2013238532 | 11/2013 |
| JP | 2013245949 | 12/2013 |
| JP | 2017505900 | 2/2017 |
| WO | 2013051214 | 4/2013 |

* cited by examiner

NAVIGATIONAL AID WITH ADAPTIVE RADAR

FIELD OF THE INVENTION

Generally the present invention pertains to electronic devices. In particular, however not exclusively, the invention relates to facilitating navigation utilizing remote sensing technology.

BACKGROUND

During the past two decades, various navigation devices e.g. in the form of portable personal gadgets, such as hand-held navigators or navigation-featured mobile terminals, have been introduced to the general public. These have hugely gained in popularity due to the various advances in the field of electronics, telecommunications, positioning technology, batteries, and generally sensing, whereupon the utility of such devices has taken the necessary leap considering the requirements for entering the so-called mass market. The size, weight, user friendliness, reliability and after all, price, have finally reached the associated critical requirements.

In addition to different mainstream applications, modern navigation solutions have turned out particularly valuable in a number of specialized contexts as well. For instance, visually impaired, i.e. blind or short-sighted, persons obviously have a rather limited ability to self-navigate. Self-navigation is, however, a somewhat critical capability while performing e.g. ordinary tasks of everyday life autonomously like visiting a nearby grocery store, not forgetting a myriad of more challenging tasks. Accordingly, restoration or cultivation of self-navigation capability would be, in many ways, a critical aspect in improving the quality of life of the impaired.

Active sensing devices commonly called as radars provide information about the environment; different entities within the scanned area, such as persons, items or various other obstacles blocking the scanning rays, may be detected, located and optionally characterized in terms of their size, velocity, materials, etc. The rapid developments in many fields of technology have accelerated the miniaturization of radars. Portable applications include, for example, navigational aids for blind people or fire fighters, for instance. In addition to portable personal devices small-sized radars will undoubtedly find further applications e.g. in moving vehicles such as cars, robots and unmanned aerial vehicles.

In the aforesaid applications the radar device, such as a smartphone-based ultrasonic sensing arrangement, will move with a person or machine it is attached to or, perhaps, integrated with. Therefore, the radar beam(s) can, from time to time, point to unwanted direction giving false alarms and potentially omitting appropriate alarms caused by obstacles on the actual route. For example, a radar device carried by a moving person with a chest strap or belt may tilt and point to either to the ground or to the sky, instead of pointing forward. The preferred scanning direction would be substantially horizontal regarding the fact that most critical obstacles to be detected are likely located substantially in the front of the person. Furthermore, sensing devices e.g. ultrasonic personal radar solutions tend to have rather modest range (a meter or two, for example) and the associated ultrasonic waves do not penetrate well through any denser materials.

SUMMARY OF THE INVENTION

The objective is to at least alleviate one or more problems described hereinabove not yet fully satisfactorily addressed by the known navigational arrangements.

The objective is achieved by the embodiments of an electronic device in the form of a navigational aid, such as a stand-alone device, and an accessory, such as a replaceable cover, suitable for physically and functionally attaching to a host device such as a smart phone so that the two could then collectively provide the desired radar functionality originally missing from the host apparatus. A related method is presented as well. It shall be noted that this summary is generally provided to introduce a selection of concepts that are further described below in the detailed description. However, the summary is not intended to specifically identify the sole important or, in particular, essential features of the claimed subject matter and thus limit the claimed subject matter's scope.

Accordingly, in one aspect of the present invention a portable electronic navigational aid, preferably in the form of an integral device, e.g. for the blind comprises
- a radio frequency, preferably microwave or millimeter wave, radar with at least one transmitting channel and a plurality of receiving channels,
- at least one orientation sensor configured to obtain data indicative of the orientation of the radar, and
- a processing element configured to adaptively control the beamforming of the radar based on the data provided by the orientation sensor.

In one embodiment, the at least one orientation sensor and/or a further sensor included in the aid comprises at least one element selected from the group consisting of: IMU (inertial measurement unit), gyroscope, three axis gyroscope, accelerometer, three axis accelerometer, magnetometer, navigation signal receiver, satellite navigation (signal) receiver, GPS (Global Positioning System) receiver, GLONASS (Global Navigation Satellite System) receiver, and GALILEO receiver.

In some embodiments the sensor(s) may further be configured to measure rotation and/or translational movement of the radar. Yet, while capable of detecting the movement or orientation of solely the radar, the sensor(s) may obviously indicate the movement/orientation of the aid in general e.g. in the preferred case where the aid is implemented as a substantially integrated device with a common housing for accommodating a number of elements including the radar.

In another embodiment, beamforming incorporates or is substantially accomplished electronically. The electronic beamforming may be performed analogously in the hardware or digitally in the software.

Alternatively or additionally, mechanical beamforming may be executed. Mechanical beamforming may include physically adapting the orientation or alignment of the radar, or at least a number of physical and functionally meaningful elements of the radar (e.g. antenna(e) may be rotated/steered) so that the associated beam direction is changed as desired.

In some embodiments, mechanical beamforming may be effectuated by means of a number of piezoelectric actuators, optionally motor(s). These elements may be both light and small, which are generally extremely beneficial properties in a mobile context.

In a further embodiment, the radar may incorporate a number of antennae. The transmitting and receiving channels may have dedicated antennae. Alternatively or additionally, shared antenna(e) may be utilized between the TX and RX channels. A channel shall be associated with at least one, optionally dedicated, antenna. Nevertheless, multiple antennae, or 'antenna elements' (radiating elements), may be provided as an array antenna as being understood by a skilled person or as a group of antennas having beams pointing to different directions.

Still in a further embodiment, the portion of the electromagnetic spectrum scanned or scannable by the radar may range from about 1 GHz or 3 GHz to about 1000 GHz. Optionally, the upper threshold frequency is about 350 GHz or less.

Yet in a further embodiment, as alluded hereinbefore, one or more sensors are utilized for determining radar movement, whereupon the obtained information is applied to coherently (synthetic-aperture radar, SAR) or incoherently combine radar measurements in different positions to increase the performance of the radar system in terms of e.g. detection accuracy.

In a further embodiment, the aid is or comprises a device that is wearable by a user. It may incorporate a number of clips, a belt, (stretch) strap, a harness, Velcro™ or a corresponding (e.g. hook-and-loop) fastener. For instance, the aid may be attached to the chest, belly, arm, wrist, neck, shoulders, leg or head (e.g. forehead) of the user. The aid may even be worn under the clothing provided that the utilized frequencies are low enough to penetrate such with sufficient power.

In a further embodiment, the aid is a stand-alone navigational aid device. Alternatively, the aid may be embodied as a more versatile mobile terminal device such as a smart phone or a phablet. It may even be provided with (attached to or integrated with) a completely other type of a device or element, such as a cane (e.g. support or probing cane) for the visually impaired. The aid/device may be self-containing in a sense it comprises e.g. a power supply such as a preferably rechargeable or at least changeable battery of its own.

In some embodiments, the beamforming may be exclusively carried out on the reception side of the radar, but in some other embodiments, the beamforming may be applied for the transmission side of the radar in addition to or instead of the reception side.

In various embodiments, the adaptive beamforming may incorporate beam pointing direction adaptation and/or scanning beam area adaptation, for instance.

In a further embodiment, responsive to the data provided by the at least one orientation sensor, the aid may be configured to trigger a notification signal to the user indicative of the orientation. Optionally, the notification signal may indicate sub-optimum orientation according to the determination criterion used, which should be corrected by re-positioning or potentially re-aligning the aid or at least the radar portion thereof in embodiments where the radar is e.g. user-controllably articulated or otherwise fixed to the housing and/or body of the aid device. The notification signal may be audible and/or tactile, for instance.

In a further embodiment, responsive to the radar measurements, an output or notification signal such as alarm signal may be triggered. The signal may be an audible signal and/or a tactile signal (e.g. vibration), for instance. In some embodiments the signal may comprise a radio frequency signal. The signal may be triggered when an object is detected within the radar range or certain sub-range thereof. The signal may be modified as the distance to the object changes, i.e. reflecting the distance. Optionally, to trigger or modify a signal the detected size of the object may be used as one input.

In another aspect, a replaceable accessory, preferably a functional cover, suitable for physically and functionally attaching to a host device such as a smart phone or other, optionally personal, mobile device, comprises
  a mechanical securing means for attaching the accessory to a mobile host device,
  a radio frequency, preferably microwave or millimeter wave, radar with at least one transmitting channel and a plurality of receiving channels, and
  a host data interface for communicating radar data to the host device and receiving control signals from the host device.

Indeed, the host data interface may comprise a transmitter or transceiver for communicating radar data to the host device. It may further comprise a receiver/transceiver for receiving information such as data requests, control or configuration signals, activation/deactivation commands, acknowledgements, etc. from the host device. Such received control signals may turn the radar on/off or adapt radar parameters to achieve the desired kind of beamforming, for example.

In another embodiment, the host data interface is designed for a wired connection. The interface may comprise a connector for the purpose. The connector may be configured for electrical or optical data transfer, for instance. Alternatively, the host data interface is configured for a wireless connection. The wireless connection may be a radio (RF) connection, optical connection, or ultrasonic connection, for example.

In a further embodiment, the accessory comprises or substantially consists of molded material, optionally plastics. At least portion of the radar may have been protectively embedded in the material during molding such as injection molding. The material of the accessory, such as the molded material, may contain a number of recesses, windows and/or openings for accommodating the radar element(s) and enabling less lossy signal propagation between the radar and the environment, respectively.

A system comprising the host device, optionally being or including a personal mobile terminal, personal computing device or e.g. a portable media player, and an embodiment of the accessory may be provided to implement the navigational aid function generally sought after herein.

In a further aspect, a method for adaptive beamforming of radar signals in navigation, optionally in self-navigation by a visually impaired person or a person acting in environment with limited visibility, comprising
  obtaining a portable electronic device, optionally having two or more detachably connectable physical and functional elements, said device comprising a radio frequency, preferably millimeter wave, radar with at least one transmitting channel and a plurality of receiving channels, at least one orientation sensor, and a processing unit,
  determining, by the processing unit, the orientation of the radar utilizing said at least one orientation sensor, and
  adapting the beamforming of the radio frequency radar based on the orientation.

The previously presented considerations concerning the various embodiments of the aid may be flexibly applied to the embodiments of the accessory or method mutatis mutandis, and vice versa, as being appreciated by a skilled person.

The utility of the present invention is due to several issues depending on each particular embodiment thereof. Through adjusting the beamforming of the radar based on orientation data, the transmission and/or reception beams may be automatically, rapidly and accurately optimized for obstacle detection in desired, important direction(s) around the aid such as the principle walking direction of a visually impaired user, or a user present in a hostile environment with low visibility, who may then perceive remote objects reliably without undue burden due to the device (mis-)placement or orientation changes immediately adversely affecting the range or detection direction of the radar.

Moreover, by using the aid in accordance with some embodiments of the invention, the user may even be cleverly notified (alarmed), based on the sensor data, about a potentially sub-optimum positioning/orientation of the aid either audibly or using tactile means among other options so that the user may take the necessary corrective actions when appropriate.

As the preferred embodiments apply radio waves, most preferably millimeter wavelengths, the achieved detection range is relatively good in contrast to e.g. ultrasonic sensing in similar context, and the aid may be worn under the outer clothing as the transmitted/received reflected signals penetrate such without excessive attenuation or disturbances.

The suggested accessory, such as a replaceable functional cover, may be conveniently retrofitted to a compatible host device, e.g. a personal mobile communications device, tablet or phablet, or a media player, to operatively establish the aid of the present invention together with the host device. Various elements of the host device, e.g. processing, memory, UI, sensing and/or data transfer elements may be utilized in the collective navigational aid system thereby formed.

Still, the present invention may find use in various applications other than self-navigation of visually impaired. For example, firefighters may appreciate a device capable of providing navigation assistance in low visibility scenarios. Robots and e.g. different unmanned vehicles (terrestrial, aerial, underwater, underground, etc.) may also benefit from the suggested adaptive radar arrangement.

The expression "a number of" refers herein to any positive integer starting from one (1), e.g. to one, two, or three.

The expression "a plurality of" refers herein to any positive integer starting from two (2), e.g. to two, three, or four.

The expression "to comprise" is applied herein as an open limitation that neither requires nor excludes the existence of also unrecited features.

The terms "a" and "an" do not denote a limitation of quantity, but denote the presence of at least one of the referenced item.

Different embodiments of the present invention are disclosed in the dependent claims.

BRIEF DESCRIPTION OF THE RELATED DRAWINGS

Next the invention is described in more detail with reference to the appended drawings in which.

DETAILED DESCRIPTION OF THE EMBODIMENTS

Figure 1:
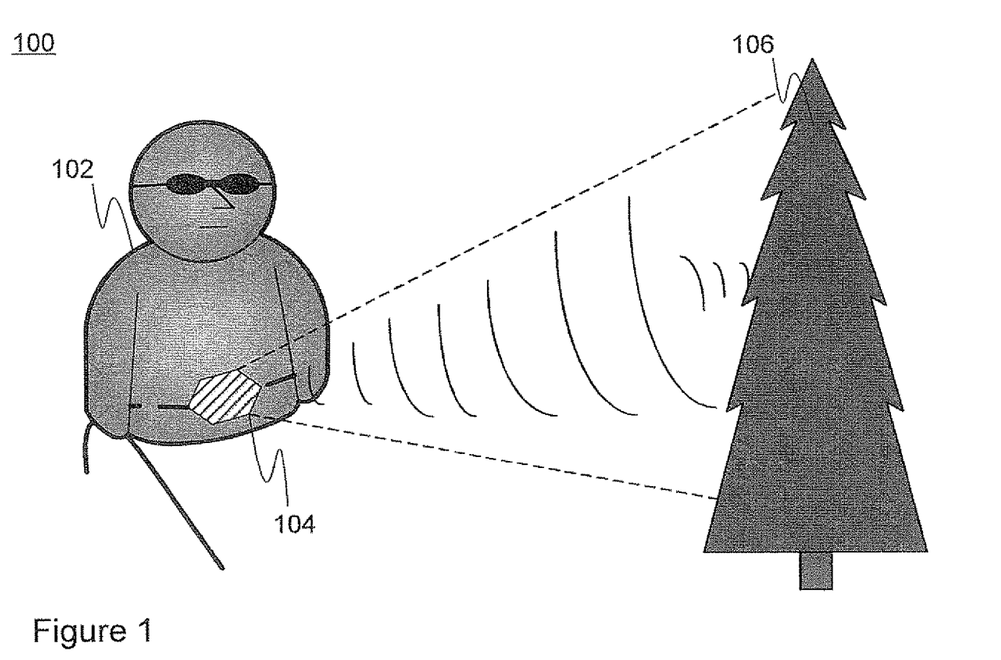
FIG. 1 is a sketch illustrating the overall concept of the present invention via one use scenario thereof.

FIG. 1 illustrates, at 100, a scenario where a visually impaired, potentially blind, person, or 'user', 102 carries or wears an embodiment of the navigational aid 104 provided with adaptively beamforming radar equipment in accordance with the present invention.

The aid 104 may be provided with an attachment means such as a belt, clip, and/or other fastening equipment to enable easy positioning of the aid in a desired location such as waist. Preferably the aid 104 is positioned such that the associated radar is well capable of scanning the area of interest in terms of objects/obstacles 106 (tree depicted as merely an example) in the way of the user 102.

As the aid 104 detects the object 106, it 104 may proceed in a predefined manner, which may refer providing a predefined audible and/or tactile alert indicative of the object's presence in general and optionally of a number of object characteristics, such as size, type and/or distance. Accordingly, the user 102 may take the necessary precautionary measures such as adapt his/her route, stop walking, ask for assistance, concentrate probing actions with a cane in the indicated direction, etc.

As the radar/aid 104 is provided with an orientation sensor, orientation of the radar/aid is to be monitored so that the exact beam pointing direction can be determined at each instant. The orientation information may be then used to control the adaptive beamforming of the radar such that its effective angle of view is kept optimal notwithstanding the variation in the orientation of the aid itself, e.g. substantially horizontal if that is preferred over other directions.

Herein, adaptive beamforming may refer to adapting the RX side, TX side, or both directions based on the orientation data. Yet, the adaptivity may be achieved mechanically, electrically, or using both the methods.

Electronic beamforming may be implemented analogously in the hardware or digitally in the software.

For mechanical adjustments (physically changing the orientation and/or other characteristics of the radar RX and/or TX side elements such as antennae), suitable means such as electrical motors, servos, piezoelectric elements, etc. may be capitalized.

Analogue beam adaptation can be executed by electronically phasing an antenna array, for instance. In the procedure, electronically switched phase shifters may be applied to form the antenna beam at different angles. Alternatively, a number of switches can be used to switch between antennas producing beams to different directions.

In digital beam forming the data from several channels may be combined using several radar transceiver channels such that the beams at different angles are formed computationally. As a simple example, this means combining the in-phase and quadrature-phase (I and Q) signals of each radar channel and adding the phase differences corresponding to the certain antenna beam pointing angle. Another example is to use multiple coded transmissions with antenna beams to different directions and separate the signals received by a wide coverage RX antenna based on the coding to obtain the target direction information (TX antenna beams). By exploiting the sensor data, unwanted antenna beam angles can be omitted in order to adapt the radar only to the desired directions. Adaptation can be done through beam pointing direction adaptation or by adapting the antenna scanning area.

Figure 2:
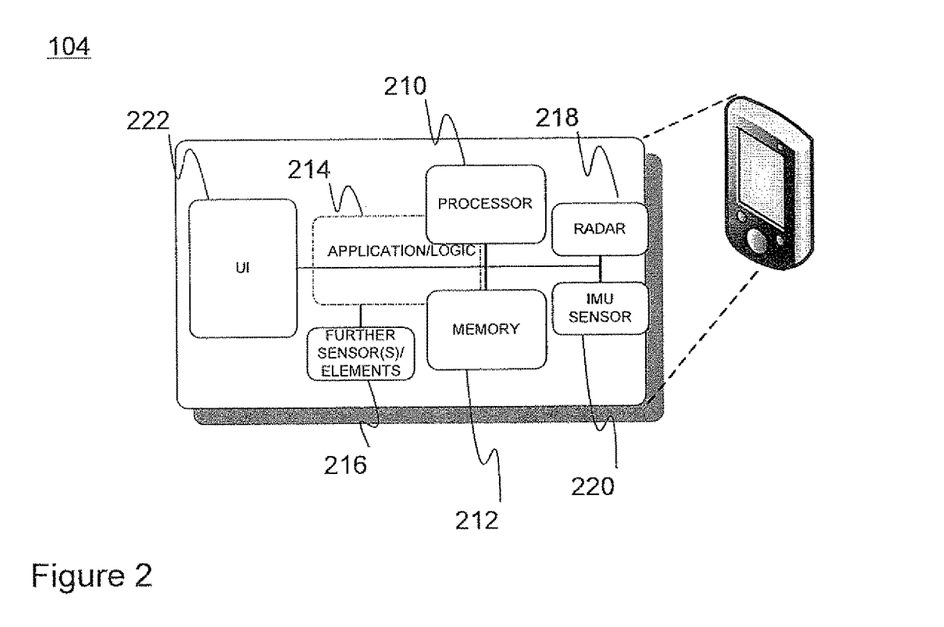
FIG. 2 is a high-level block diagram depicting the internals of an embodiment of the navigational aid in accordance with the present invention.

FIG. 2 is a high-level block diagram depicting the internals of an embodiment of the navigational aid in accordance with the present invention.

The device establishing the aid comprises one or more processing devices capable of processing instructions and other data, such as one or more microprocessors, microcontrollers, DSP's (digital signal processor), programmable logic chips, etc. The processing entity 210 may thus, as a functional entity, comprise a plurality of mutually co-operating processors and/or a number of sub-processors connected to a central processing unit, for instance. The processing entity 210 may be configured to execute the code 214 stored in a memory 212, which may refer to instructions and data relative to the software logic and software architecture for controlling the device 104 and its various components.

The memory entity 212 may be divided between one or more physical memory chips or other memory elements. The memory 212 may further refer to and include other storage media such as a memory card or a hard drive. The memory 212 may be or contain non-volatile, e.g. ROM (Read Only Memory), and/or volatile, e.g. RAM (Random Access Memory), memory. Software (product) code may also be provided on a carrier medium such as a memory card, a memory stick, an optical disc (e.g. CD-ROM or DVD), or some other non-volatile memory carrier, for storage, transfer, and installation purposes, for instance. At least functionally connected processing 210 and memory entities 212 may be physically separate or integrated e.g. on a common chip.

The UI (user interface) 222 may comprise a display or other visual indication means (e.g. LED(s) or other light(s)) to provide visual indications of the state of the device, radar status, object detection status, battery status, etc. to external entities. Particularly in the context of visually impaired, the UI 222 may incorporate audio (e.g. buzzer or loudspeaker) and/or tactile output means (e.g. vibration element) for the same purpose.

Yet, a control input means such as a number of buttons, knobs, switches, a touchpad, etc. may be provided. On/off power switching may be provided using such input. Alternatively or additionally, the user may control the aid 104 such as radar features (e.g. activation/deactivation or selection of a functional state or parameter (e.g. detection distance or direction) therewith. The input means may include a microphone with A/D converter to capture sound such as voice to be used as control input.

Obviously, the navigational aid 104 contains a radar 218 for the detection of remote objects. Advantageously, the radar 218 is radio frequency radar. The applied wavelengths may fall under the millimeter range for a variety of related advantages such as reasonable range and ability to propagate through many materials such as ordinary clothing.

The aid 104 further includes an orientation sensor 220 such as IMU. Data provided by the sensor 220 is utilized in adaptively controlling the beamforming of the radar. For example, orientation changes detected by the sensor 220 and indicated by the sensor data may be compensated in the adaptive beamforming such that the radar detection direction substantially remains as desired. For example, substantially horizontal (beam) direction, or 'scan axis', may be preferred over angles clearly deviating from the horizontal direction.

The aid 104 may comprise a number of further sensors and/or other elements 216 such as a data interface for communication with external devices such as computers. Control or configuration input may be received and/or radar/orientation data transmitted, for instance, therethrough.

Figure 3:
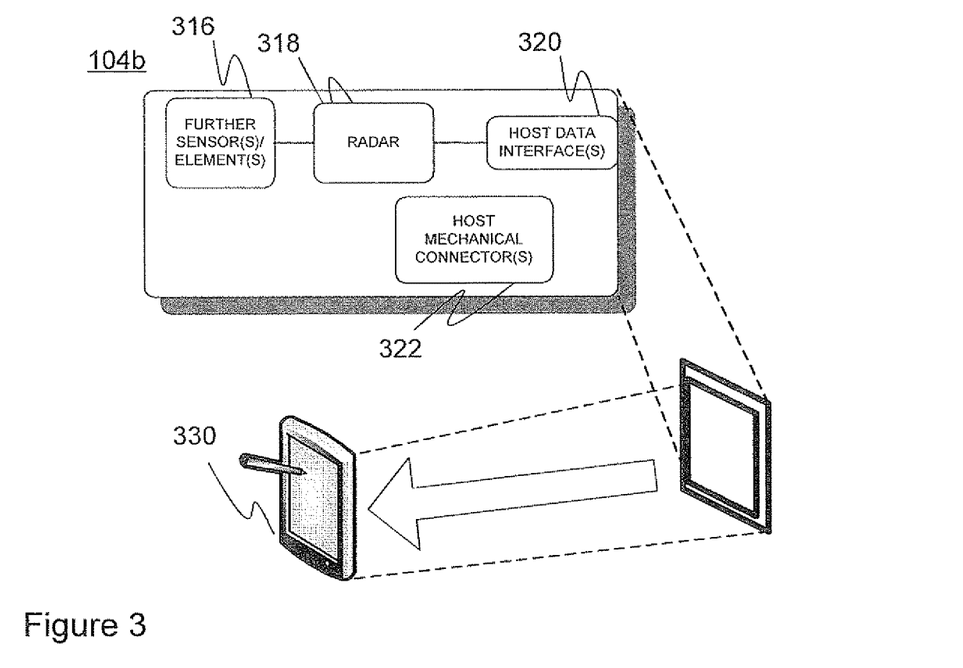
FIG. 3 is a high-level block diagram depicting the internals of an embodiment of the accessory in accordance with the present invention.

FIG. 3 is a high-level block diagram depicting the internals of an embodiment 104b of the accessory in accordance with the present invention. This particular embodiment may be realized as at least partial cover element for a host device 330, such as a smartphone, tablet, phablet or other electronic device. Preferably, the host device 330 contains a number of elements, such as a processing unit and orientation sensor (e.g. accelerometer), which may be exploited in the construction of an adaptive beamforming capable radar as suggested herein together with various element(s) of the accessory 104b.

The accessory 104b comprises an embodiment of a radar described hereinearlier, e.g. a radio frequency millimeter wave radar, and data interface 320 for providing radar data to the host device 330 and control data therefrom back to the radar 318. The data interface 320 may be electrical or optical, for instance. Yet, it may be wired (contact based) or wireless. Host mechanical connector(s) 322 refer to physical fastening equipment such as clip(s) or e.g. a connector integrated with the data interface (e.g. electrical conductors) for securing the accessory 104b to the host device 330. The accessory 104b may, depending on the implementation, comprise further elements 316 such as internal (orientation) sensor, internal memory, processing element(s), etc.

In overall, it shall be understood by a skilled person that both the aid 104 and the accessory 104b may comprise numerous additional functional and/or structural elements for providing advantageous communication, processing, sensing or other features, whereupon this disclosure is not to be construed as limiting the presence of the additional elements in any manner nor does it disclose the sole applicable implementations of the aid 104 or the accessory 104b.

Figure 4:
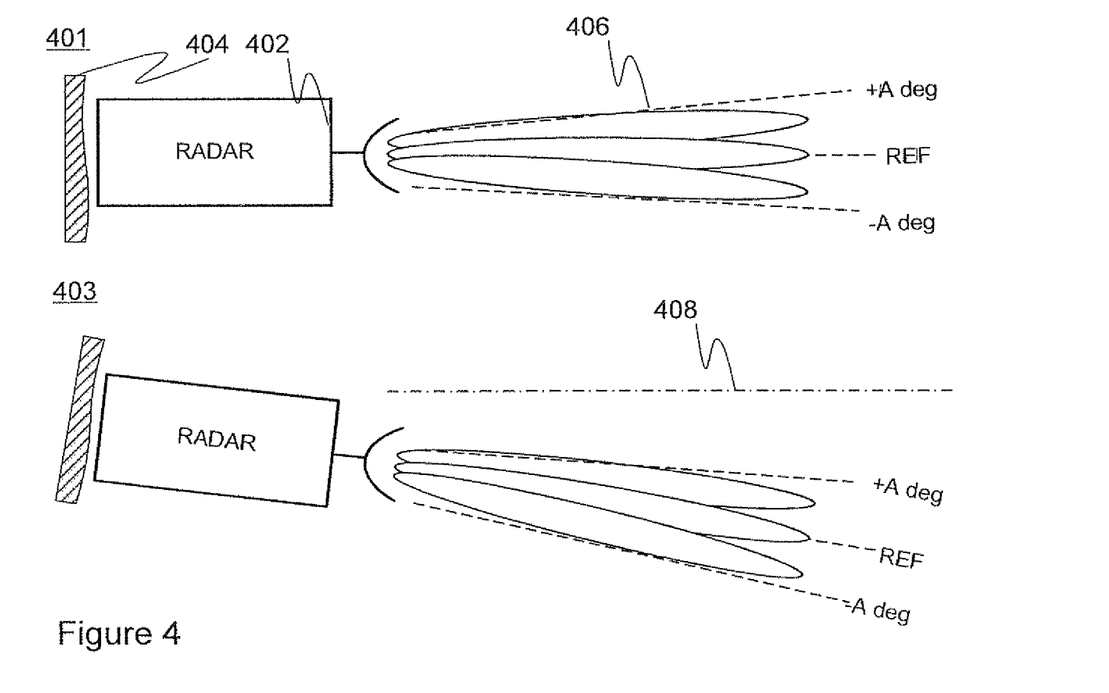
FIG. 4 illustrates a scenario in which adaptive beamforming of the present invention is not activated in connection with a portable radar device.

FIG. 4 illustrates a situation in which adaptive beamforming is not activated in connection with a portable radar device.

At 401, the apparatus containing the radar 402 has been attached to a support 404, which could refer to a user's belt, for instance, in the case of a personal navigation device. When the user stands upright, the radar beam(s) 406, which may herein refer to both TX and RX side, then extend substantially horizontally in the front of the user, defining a substantially conical pattern 406.

The direction/alignment of the radar beam(s) relative to the device body/cover has been pre-configured at the factory and is not at least automatically controlled, whereupon in the scenario shown at 403 the user walks hunched up and the radar device is tilted and the resulting scanning direction of the radar is far from a horizontal one 408 (the beam is basically directed towards the ground) and therefore inferior if e.g. head-level obstacles like street signs are to be duly detected prior to physical contact therewith.

More generally, as the radar moves with the person or machine it is attached to, the radar beam can, from time to time, thus point to unwanted or unknown directions giving e.g. false alarms.

Figure 5:
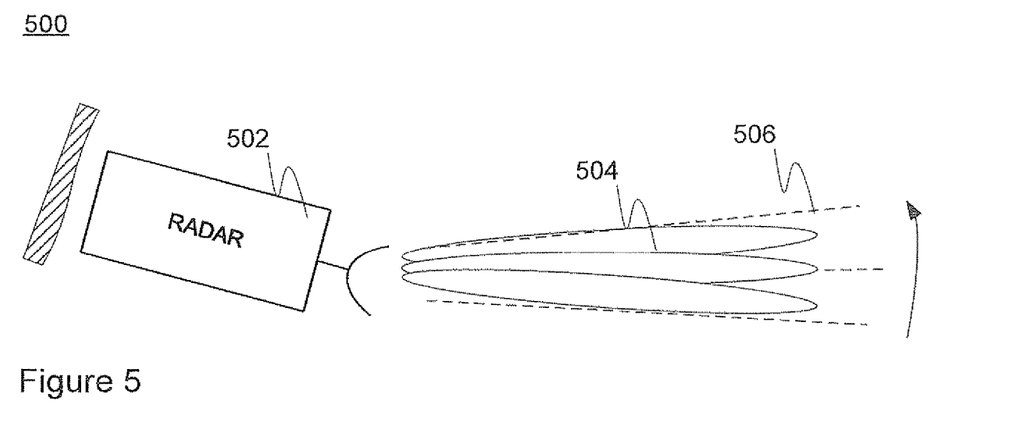
FIG. 5 discloses an embodiment of beamforming adaptation in accordance with the present invention.

To overcome the above problem, FIG. 5 discloses an embodiment of beamforming adaptation in accordance with the present invention.

At 500 a tilted navigational aid 502 is shown in a scenario substantially corresponding to the one depicted at 403. However, in this case at least one orientation sensor provided in the aid is utilized to determine the orientation of the device and to control the beamforming of the radar accordingly, i.e. compensate the (downward) tilt by steering the TX (indicated by the dotted lines 506) and RX (indicated by the approximately parabolic patterns 504) to the opposing (upward) direction so that the related radar beams scan the forward area of the aid substantially horizontally.

In practice, the orientation sensor may include an inertial sensor. The sensor may provide information about the orientation and optionally translational movement (to be used in SAR measurements, for example) of the radar. The information may be sent to a processing unit that controls the directivities of transmitting and receiving antennas such that the (TX) radar signals are transmitted only to a desired direction and signals only from that direction are the ones that are effectively received (RX). The RX and TX beams may thus be relatively narrow in this embodiment.

Figure 6:
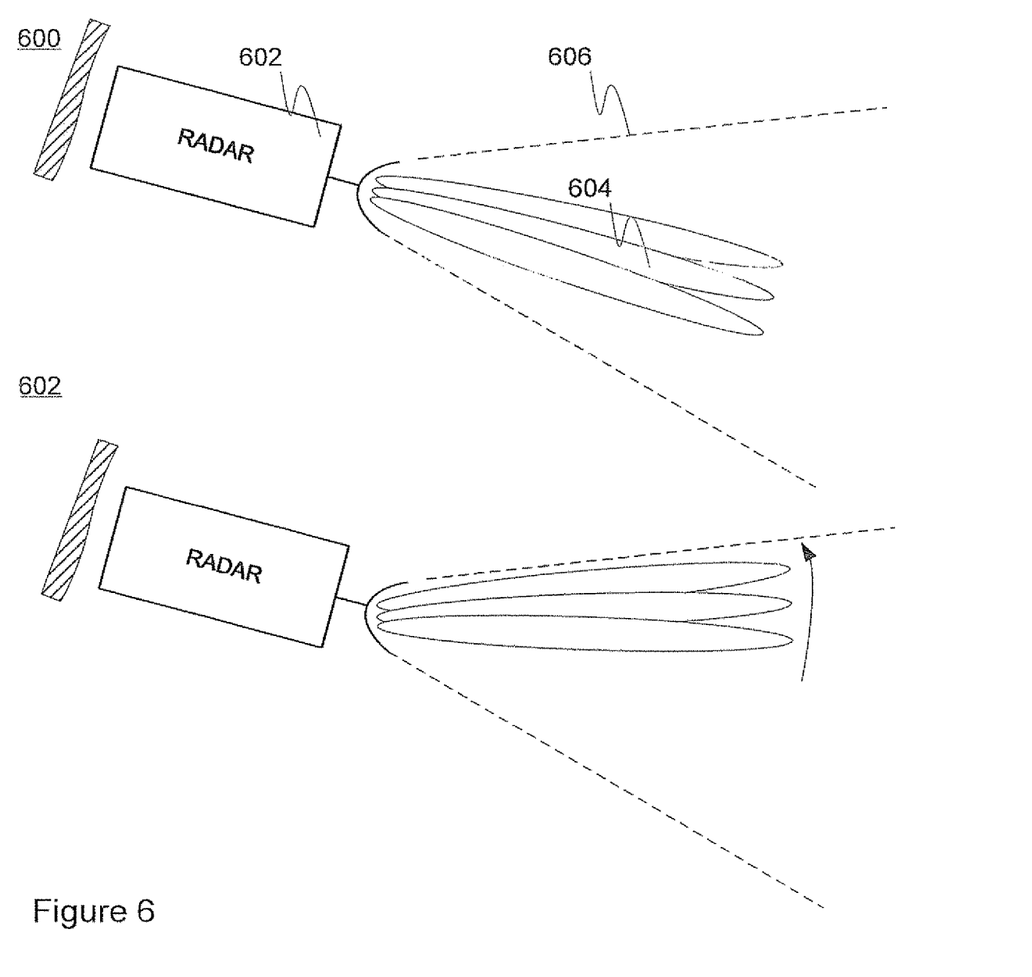
FIG. 6 discloses another embodiment wherein TX side applies wide fixed beam and RX side supports adaptive beam steering.

FIG. 6 discloses an embodiment wherein TX side applies a wide fixed beam and RX side supports adaptive beam steering.

In this embodiment, the TX side applies a wide beam with no adaptive steering, provided by e.g. a single antenna such as a substantially omnidirectional antenna. The RX side may utilize multiple channels provided by a plurality of antenna elements, e.g. antenna array or several physically separate antennae. Alternatively, the TX beam could be adaptively steered with a wide RX beam.

At 600, the aid 602 comprising the radar is shown tilted as in the previous figure. The RX 604 and TX 606 beams point generally downwards.

However, at 602, the downward tilt angle of the aid has been compensated in the radar RX beam 604 that is (central axis) steered so as to extend horizontally (of course, other alternative target alignment could be applied as well) instead of the original tilted direction. As a result, the person or device carrying the navigational aid, may still obtain reliable detection information, such as obstacle alerts, from the radar regarding the environment and objects residing farther away in the front instead of the nearby ground area only.

Also in this example, the orientation sensor used to measure the orientation and optionally translational movement of the aid/radar may include an IMU. Preferably, several RX channels are utilized (at least two antenna elements) to enable beam steering functionality even though the RX side radar beams may be relatively wide. The sensor data is applied by a processing unit to dynamically control the directivity of RX antennas to obtain signals from the desired direction only. Due to wide beam width the TX antenna radiates in different directions and adaptive steering is not necessary. This is a technically simpler example than the one in FIG. 5 at the cost of a worse signal to noise ratio.

Although the embodiments of FIGS. 5 and 6 were discussed by explicitly referring to navigational aid device only, a person skilled in the art will appreciate the fact that basically the same solutions may be implemented by the embodiments of the radar-containing accessory and associated host device when connected together.

Figure 7:
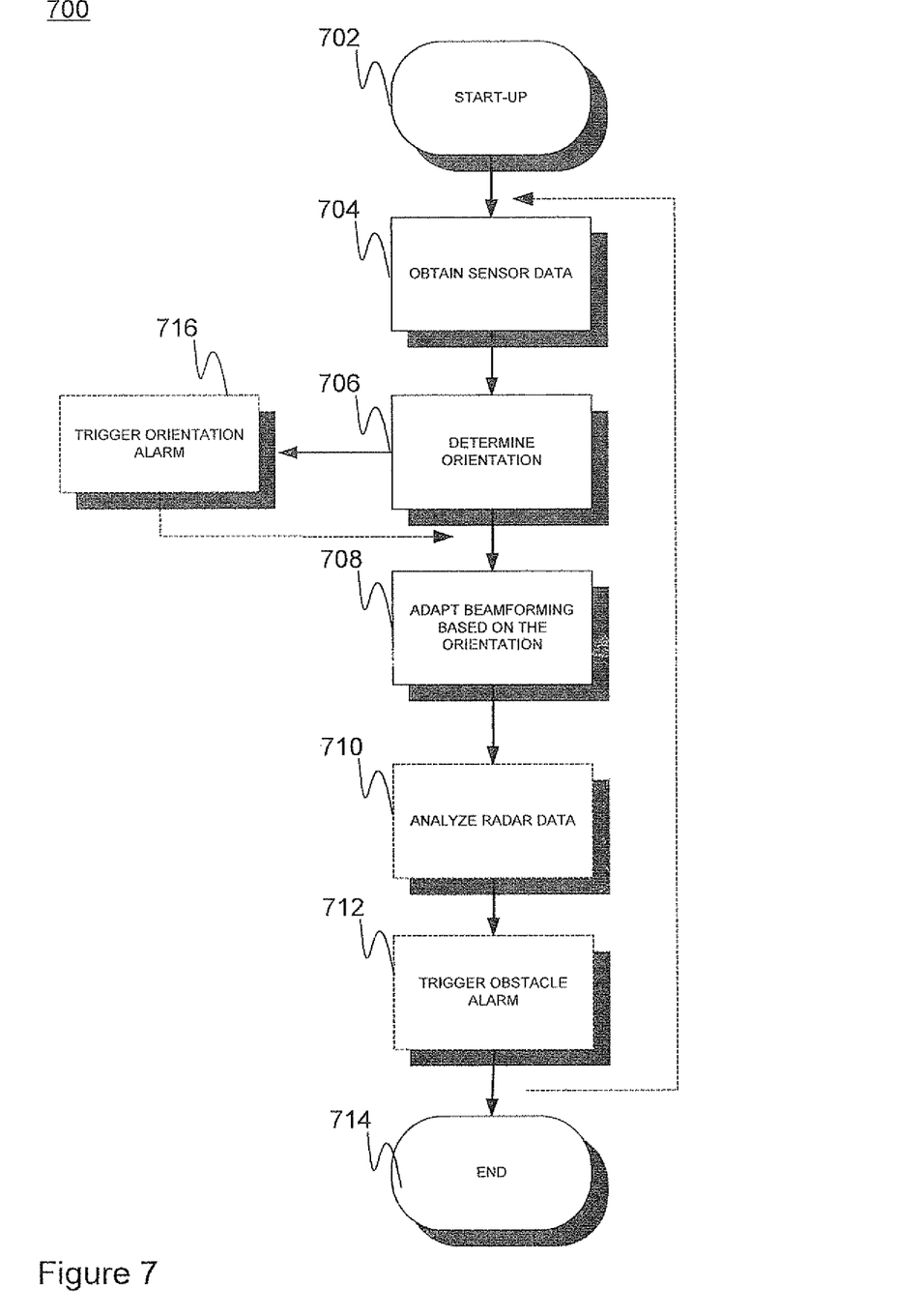
FIG. 7 is a flow diagram disclosing an embodiment of a method in accordance with the present invention.

FIG. 7 is a flow diagram disclosing an embodiment of a method 700 in accordance with the present invention. At start-up 702, a preferably portable electronic device such as a stand-alone navigational aid or accessory like a cover combined with a host device such as a mobile terminal, is obtained and configured, which may refer to downloading and installing suitable software, etc.

This stand-alone, substantially integral, or multiple detachably connected components containing device comprises at least a radio frequency, preferably millimeter wave, radar with at least one transmitting channel and advantageously a plurality of receiving channels, at least one orientation sensor, and a processing unit, such as a microcontroller, microprocessor or digital signal processor with the necessary memory, in addition to various other potential elements.

At 704 orientation data, which may include rotational movement data, and optionally translational movement data are obtained using the at least one orientation sensor and optionally further sensor(s).

At 706, the orientation of the device is determined based on the data provided by the sensor(s). E.g. tilt angle relative to a reference may be determined. Optional parameters indicative of e.g. device location, movement characteristics (speed, acceleration, etc.) may also be determined.

Item 716 refers to optional phase, wherein an orientation-related alarm such as a predefined vibration or sound signal is issued responsive to the detected inferior orientation of the device. For example, if in a walking context it is noticed that the device points substantially directly downwards, an alarm may triggered to notify the user of (re-)alignment need.

Alternative or additional alarms may be triggered based on the sensor data as well. For example, if the device is located under several layers of thick clothing, the radar performance may suffer and be detected from the received signals, whereupon a related, optionally characterizing, alarm may be triggered.

At 708, radar beamforming is adapted in the light of the determined orientation as explained hereinbefore. For example, a detected tilt of the device may be compensated by steering the beam(s) substantially to the opposite direction so that the predefined, desired beam/scan directions (may be factory-determined and/or user-adjustable via the UI of the device) are maintained if possible.

Yet, radar data may be subjected to e.g. SAR technique combining measurement results from multiple sequential radar locations as mentioned hereinbefore (not shown in the figure).

Items 710 and 712 refer to analyzing the actual radar data in terms of detectable objects/obstacles within the radar range and possible provision of related alarms or other signals, respectively. A general warning signal indicative of an object/obstacle within the range may be provided, or more characterizing signals may be issued. For example, intensity of sound or vibration signal may indicate the detected distance to an object (smaller distance→higher intensity, for instance).

The dotted loop-back arrow highlights the potentially repetitive, continuous execution of the method items.

Method execution is ended at 714.

Ultimately, a skilled person may, on the basis of this disclosure and general knowledge, apply the provided teachings in order to implement the scope of the present invention as defined by the appended claims. Generally, the various principles set forth herein could be also at least selectively utilized in use contexts not relying on radio frequency, or particularly millimeter wave, radars. Instead, the radar technology in question could be ultrasonic, infrared or optical among other options. Further, a number of features such as the alarming feature suggested herein could also be applied in navigational aids and various (other) radar/detector devices lacking e.g. the beamforming aspect, potentially thus having a single RX channel only, for example.

The invention claimed is:

1. A wearable electronic navigational aid, including:
   a fastening equipment for attaching the electronic navigational aid to shoulders, neck, chest, or belly of a user,
   a radio frequency radar including at least one transmitting (TX) channel and a plurality of receiving (RX) channels, the radio frequency radar being configured to provide transmission beams and reception beams in a direction in which the user is walking for obstacle detection in a user-selected desired scan direction of the radar,
   a user interface configured to receive user input for adjusting the user-selected desired scan direction of the radar,
   at least one orientation sensor configured to obtain data indicative of the orientation of the radar, and
   a processor configured to detect from the data provided by the orientation sensor a tilt of the radar and respond to the tilt by adaptively controlling beamforming of the radar to compensate the tilt and maintain the user-selected desired scan direction of the radar in the direction in which the user is walking.

2. The electronic navigational aid of claim 1, wherein said at least one orientation sensor or a further sensor of the navigational aid comprises at least one element selected from the group consisting of: IMU (inertial measurement unit), gyroscope, three axis gyroscope, accelerometer, three axis accelerometer, magnetometer, navigation signal receiver, satellite navigation (signal) receiver, GPS (Global Positioning System) receiver, GLONASS (Global Navigation Satellite System) receiver, and GALILEO receiver.

3. The electronic navigational aid of claim 1, additionally comprising at least one translational sensor configured to measure at least translational movement of the radar utilizing said at least one orientation sensor.

4. The electronic navigational aid of claim 3, wherein information associated with the measured translational movement is applied to coherently or incoherently combine radar measurements in different positions to augment performance of the radar.

5. The electronic navigational aid of claim 4, wherein the coherent combining of the radar measurements includes applying a SAR (synthetic-aperture radar) technique.

6. The electronic navigational aid of claim 1, wherein the beamforming is performed electronically.

7. The electronic navigational aid of claim 6, wherein the beamforming performed electronically includes digital or analog implementations.

8. The electronic navigational aid of claim 1, wherein the beamforming is executed by a plurality of piezoelectric actuators including motors.

9. The electronic navigational aid of claim 1, wherein the radar operates at an upper threshold frequency of approximately up to 350 GHz.

10. The electronic navigational aid of claim 1, the fastening equipment comprising:
    a support for the radar, the at least one orientation sensor and the processor, and
    at least one fastening element in communication with the support, the at least one fastening element selected from the group consisting of a clip, a hook-and-loop type element, a belt, a stretch strap, a harness and a screw.

11. The electronic navigational aid of claim 1, configured to trigger an alarm signal responsive to the determined pointing direction of a beam of the radar being outside of a predetermined orientation of the radar.

12. The electronic navigational aid of claim 11, wherein the alarm signal comprises an audible or tactile signal.

13. A method for adaptive beamforming of radar signals in navigation, comprising:
    attaching an electronic navigational aid to shoulders, neck, chest, or belly of a user, said electronic navigational aid comprising:
       a radio frequency radar including at least one transmitting channel and a plurality of receiving channels configured to provide transmission beams and reception beams in a direction in which the user is walking for obstacle detection in a user-selected desired scan direction of the radar,
       at least one orientation sensor,
       a user interface, and
       a processing unit;
    receiving user input for adjusting the user-selected desired scan direction of the radar;
    obtaining with the at least one orientation sensor data indicative of the orientation of the radar;
    detecting, by the processing unit, from the orientation sensor data a tilt in the orientation of the radar; and
    responding, by the processing unit, to the tilt by adapting the beamforming of the radio frequency radar to compensate the tilt and maintain the user-selected desired scan direction of the radar in the direction in which the user is walking.

* * * * *